United States Patent
Nobe

(10) Patent No.: US 6,646,815 B2
(45) Date of Patent: Nov. 11, 2003

(54) ZOOM LENS

(75) Inventor: Shinsuke Nobe, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/024,263

(22) Filed: Dec. 21, 2001

(65) Prior Publication Data

US 2002/0149857 A1 Oct. 17, 2002

(30) Foreign Application Priority Data

Dec. 25, 2000 (JP) ............................... 2000/392498

(51) Int. Cl.[7] ............................................. G02B 15/14
(52) U.S. Cl. ............................... 359/689; 359/687
(58) Field of Search .......................... 359/687, 689

(56) References Cited

U.S. PATENT DOCUMENTS 4,690,513 A * 9/1987 Takahashi et al. ........... 359/686
5,568,323 A * 10/1996 Sensui ......................... 359/689
6,349,002 B1 * 2/2002 Shibayama et al. ......... 359/689

FOREIGN PATENT DOCUMENTS

JP 04-217219 * 8/1992
JP 11-52246 * 2/1999

* cited by examiner

Primary Examiner—Georgia Epps
Assistant Examiner—William Choi
(74) Attorney, Agent, or Firm—Finnegan, Henderson, Farabow, Garrett & Dunner, L.L.P.

(57) ABSTRACT

A zoom lens, comprises: three lens groups including a first lens group having a negative refracting power, a second lens group having a positive refracting power and a third lens group having a positive refracting power arranged serially in this order from the object side. The second lens group comprises a positive lens, a cemented lens including a positive lens and a negative lens and one lens arranged serially in this order from the object side. The following conditional expression is satisfied;

$$0.4 < f_w/f_2 < 1.0$$

where $f_2$ represents a focal length of the second lens group and $f_w$ represents a focal length of the total optical system at a wide-angle end.

25 Claims, 14 Drawing Sheets

ZOOM LENS

BACKGROUND OF THE INVENTION

The present invention relates to a zoom lens, and in particular, to a zoom lens which is used for a digital still camera or for a video camera, and especially has a high resolving power suitable for a camera employing a high-density pixel type CCD, and has F number of about 2.8 at a wide-angle end and a ratio of variable magnification of about 2–3.

With the recent spread of personal computers and of handling of image data by the personal computers, digital still cameras for taking in image data have been demanded increasingly. Further, with a trend for densification of CCD, a demand for the zoom lens having higher image forming power has been increased. In addition, a compact one which is handy for carrying is demanded.

Zoom lenses with a magnification of about 3 which are suitable for a camera employing a solid-state image sensor such as CCD or the like have so far been disclosed in terms of technology, and examples thereof disclosed in TOK-KAIHEI Nos. 10-39214, 11-52246 and 11-287953 and TOKKAI No. 2000-9997 are known.

However, in these conventional examples, there have been problems that distortion at a wide-angle end is extremely large, an angle of view at a wide-angle end is small and a total lens length is great.

SUMMARY OF THE INVENTION

The invention has been achieved in view of the problems stated above, and its object is to provide a zoom lens which has a ratio of variable magnification of about 2–3 as well as high image forming power and is suitable to be used for a digital still camera and a video camera both employing CCD of a high density pixel type.

The object mentioned above can be attained by either one of the following structures.

Structure (1)

A zoom lens having therein three lens groups including a first lens group having a negative refracting power, a second lens group having a positive refracting power and a third lens group having a positive refracting power in this order from the object side, in which the second lens group is composed of a positive lens, a cemented lens including a positive lens and a negative lens and one lens in this order from the object side, and when changing a magnification from the wide-angle side to the telephoto side, the first, second and third lens groups are moved on an optical axis so that a distance between the first lens group and the second lens group is reduced and a distance between the second lens group and the third lens group is increased for the magnification change, wherein the following conditional expression is satisfied;

$$0.4 < f_w/f_2 < 1.0 \tag{1}$$

wherein, $f_2$ represents a focal length of the second lens group and $f_w$ represents a focal length of the total optical system at a wide-angle end.

Structure (2)

The zoom lens described in (1) wherein the first lens group has at least one aspheric surface and is composed of two pieces including a negative lens and a positive lens in this order from the object side, and the following conditional expression is satisfied;

$$-0.7 < f_w/f_1 < -0.3 \tag{2}$$

wherein, $f_1$ represents a focal length of the first lens group.

Structure (3)

The zoom lens described in (2) wherein the first lens group is composed of two pieces including a negative meniscus lens whose concave surface faces toward the image side and a positive meniscus lens whose convex surface faces toward the object side in this order from the object side.

Structure (4)

The zoom lens described in (1) wherein the first lens group is composed of three pieces including two negative lenses and one positive lens, and the following conditional expression is satisfied.

$$-0.7 < f_w/f_1 < 0.3 \tag{2}$$

Structure (5)

The zoom lens described in (4) wherein the first lens group is composed of three pieces including a negative meniscus lens whose concave surface faces toward the image side, a negative lens and a positive lens in this order from the object side.

Structure (6)

The zoom lens described in (5) wherein the first lens group is composed of a negative meniscus lens whose concave surface faces toward the image side and a cemented lens including a negative lens and a positive meniscus lens whose convex surface faces toward the object side in this order from the object side.

Structure (7)

The zoom lens described in either one of (1)–(6) wherein the second lens group has an aspheric surface on at least one surface.

Structure (8)

The zoom lens described in (7) wherein at least one surface of the positive lens closest to the object in the second lens group has an aspheric surface.

Structure (9)

The zoom lens described in either one of (1)–(8) wherein the following conditional expression is satisfied;

$$|f_w/f_{2i}| < 0.5 \tag{3}$$

wherein, $f_{2i}$ represents a focal length of the lens closest to the image in the second lens group.

Structure (10)

The zoom lens described in either one of (1)–(9) wherein the lens closest to the image in the second lens group is a meniscus lens whose convex surface faces toward the image side, and the following conditional expression is satisfied.

$$|f_w/f_{2i}| < 0.4 \tag{4}$$

Structure (11)

The zoom lens described in either one of (1)–(10) wherein the lens closest to the image in the second lens group is a positive lens, and the following conditional expression is satisfied.

$$0.0 < f_w/f_{2i} < 0.4 \tag{5}$$

Structure (12)

The zoom lens described in either one of (1)–(10) wherein the lens closest to the image in the second lens group is a negative lens, and the following conditional expression is satisfied.

$$-0.3 < f_w/f_{2i} < 0.0 \tag{6}$$

Structure (13)

The zoom lens described in either one of (1)–(12) wherein the following conditional expression is satisfied.

$$0.5 < f_w/f_2 < 0.7 \tag{7}$$

Structure (14)

The zoom lens described in either one of (1)–(13) wherein the third lens group is a single lens having a positive refracting power.

Structure (15)

The zoom lens described in (14) wherein the third lens group is a single lens having a positive refracting power of not less than 50 in terms of Abbe number.

Structure (16)

The zoom lens described in either one of (1)–(15) wherein the third lens group simply moves on an optical axis toward the object side when changing a magnification from the wide-angle side to the telephoto side, and satisfies the following conditional expression;

$$0.2 < f_w/f_3 < 0.7 \tag{8}$$

wherein, $f_3$ represents a focal length of the third lens group.

Structure (17)

The zoom lens described in either one of (1)–(16) wherein the third lens group conducts focusing to cover from the object at the infinite point to the object at the short distance, and satisfies the following conditional expression.

$$0.2 < f_w/f_3 < 0.7 \tag{8}$$

In the zoom lens of the invention, a first lens group having a negative refracting power, a second lens group having a positive refracting power and a third lens group having a positive refracting power are provided, and when zooming from the wide-angle end to the telephoto end, each lens group is moved so that a distance between the first lens group and the second lens group is reduced and a distance between the second lens group and the third lens group is increased. When the second lens group is composed of a positive lens, a cemented lens including a positive lens and a negative lens and one lens in this order from the object side, a magnification can be changed effectively and the total optical system can be made to be compact.

To be more effective, it is preferable that the first lens group is structured by a negative meniscus lens whose concave surface faces toward the image side and by a positive meniscus lens whose convex surface faces toward the object side in this order from the object side, and has an aspheric surface, and this structure makes it possible to reduce the number of lenses and thereby to correct satisfactorily the distortion that is easily caused at the wide-angle side. Or, it is preferable that the first lens group is structured by a negative meniscus lens whose concave surface faces toward the image side, a negative lens and by a positive meniscus lens whose convex surface faces toward the object side in this order from the object side, and this structure makes it possible to correct satisfactorily spherical aberration caused mainly at the telephoto side.

It is preferable that the lens closest to the image side in the second lens group is a meniscus lens whose convex surface faces toward the image side, and this structure makes the second lens group itself to be compact, and it further corrects spherical aberration and coma satisfactorily by employing an aspheric surface.

The third lens group can correct the deviation of the focus point that is caused in the course of zooming, by moving on an optical axis. When focusing is necessary to comply with a change in a distance to an object, it is preferable to conduct the focusing by moving the third lens group. Though it is also possible to conduct focusing by moving the first lens group, a burden for the motor is greater in this case because the larger and heavier lens group must be moved, compared with an occasion to move the third lens group. In addition, when the first lens group is moved for the focusing, it is further made to be greater in size because a light flux in the course of advancing the first lens group needs to be secured. It is preferable that the third lens group is a single lens having Abbe number of 50 or more. With this structure, chromatic aberration generated in the third lens group can be lightened.

Next, each conditional expression will be explained. Conditional expressions (1) and (7) are those to regulate a refracting power of the second lens group and to obtain an excellent image forming power with a fully compact lens. When the value is above the lower limit of the conditional expression (1), the total optical system keeps proper, and miniaturization thereof can be realized. Further, when the value is below the upper limit, various aberrations generated in the second lens group becomes small, and spherical aberration and coma, in particular, can becomes small and excellent correction can be done, even when an aspheric surface is used in the second lens group. It is preferable to be within a range of conditional expression (7) to obtain a lens which is compact and is powerful.

Conditional expression (2) is one to regulate a refracting power of the first lens group and to obtain an excellent image forming power with a fully compact lens. When the value is above the lower limit of the conditional expression, various aberrations generated in the first lens group becomes small, and in particular, excellent correction for distortion at a wide-angle end, transverse chromatic aberration and for spherical aberration at a telephoto end can be achieved. Further, when the value is below the upper limit of the conditional expression, miniaturization of the total optical system can be realized.

Conditional expression (3), conditional expression (4), conditional expression (5) or conditional expression (6) is one to regulate a refracting power of the lens closest to the image side in the second lens group. When the value satisfies the conditional expression of conditional expression (3), various aberrations generated in the second lens group can be made smaller, and spherical aberration and coma, in particular, becomes smaller, and miniaturization of the total optical system can be realized. For obtaining a lens which is more compact and more powerful, it is preferable to be within a range of conditional expression (4), conditional expression (5) or conditional expression (6).

Conditional expression (8) is one to regulate a refracting power of the third lens group and to obtain an excellent image forming power with a fully compact lens. When the value is above the lower limit of the conditional expression, a back focus can be shortened, an amount of movement of the third lens group for focusing is increased and the total length can be decreased, which is preferable. Further, when the value is below the upper limit of the conditional expression, coma and a curvature of the field generated in the third lens group can be made small, and correction can be conducted very well, even when an aspheric surface is used in the third lens group.

DETAILED DESCRIPTION OF THE PREFERRED EMBODIMENT

EXAMPLE

Examples of the zoom lens of the invention will be shown below. Symbols in each example are as follows.

f: Focal length $F_{No}$: F number $\omega$: Half field angle r: Radius of curvature of refracting interface d: Distance between refracting interfaces $n_d$: Refractive index at d line of lens material $v_d$: Abbe number of lens material $f_1$: Focal length of first lens group $f_2$: Focal length of second lens group $f_{2i}$: Focal length of lens positioned to be closest to the image side in second lens group $f_3$: Focal length of third lens group $f_w$: Focal length at wide-angle end of the total optical system A form of the aspheric surface is shown by the following expression "Numeral 1", when X-axis is taken in the direction of an optical axis, and h represents a height in the direction perpendicular to the optical axis.

$$X = \frac{h^2/r}{1 + \sqrt{1 - (1+\kappa)h^2/r^2}} + A_4 h^4 + A_6 h^6 + A_8 h^8 + A_{10} h^{10} + A_{12} h^{12} \qquad \text{(Numeral 1)}$$

In "Numeral 1", K represents a constant of the cone of the aspheric surface, $A_i$ represents a coefficient of the aspheric surface (i=4, 6, 8, 10 and 12), and r represents a paraxial radius of curvature.

In the table, each of "*1" and "*2" indicates a plastic lens. Incidentally, FIG. 1, FIG. 3, FIG. 5, FIG. 7, FIG. 9, FIG. 11 and FIG. 13 respectively show the condition of an object at infinite point of an intermediate area. In the diagram, G1 shows a first lens group, G2 shows a second lens group, G3 shows a third lens group, S shows an aperture-stop and CG shoes a glass block.

Example 1

Figure 1:
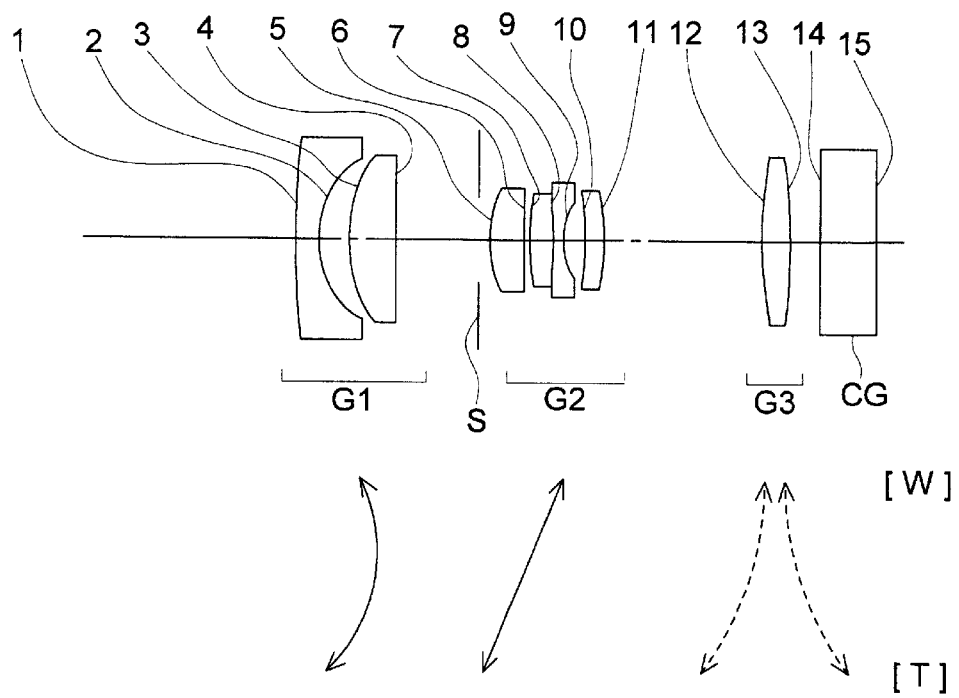
FIG. 1 is a sectional view of the lens in Example 1.
Figure 2:
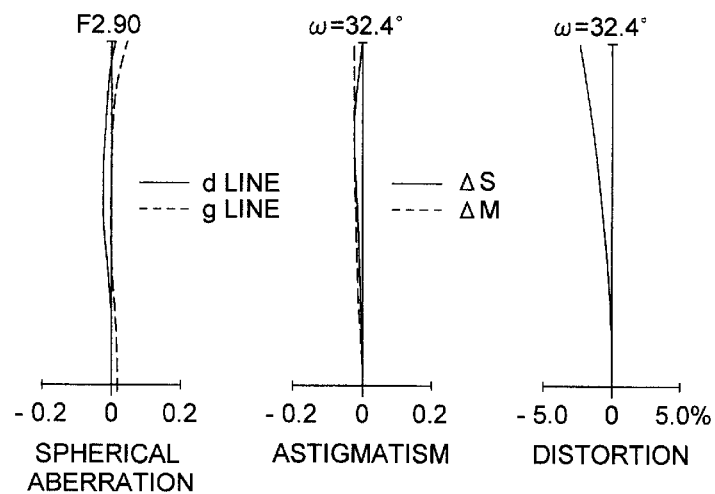
FIG. 2(a) shows lens aberrations at wide-angle end.
FIG. 2(b) shows intermediate area and FIG. 2(c) shows telephoto end in Example 1.
Figure 2:
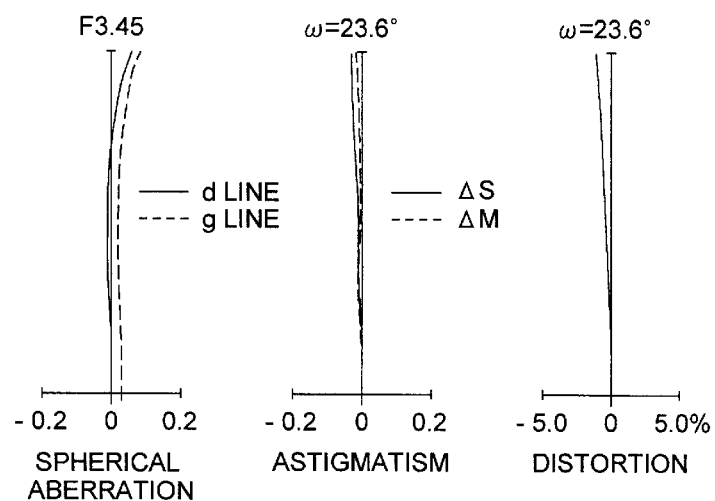
Figure 2:
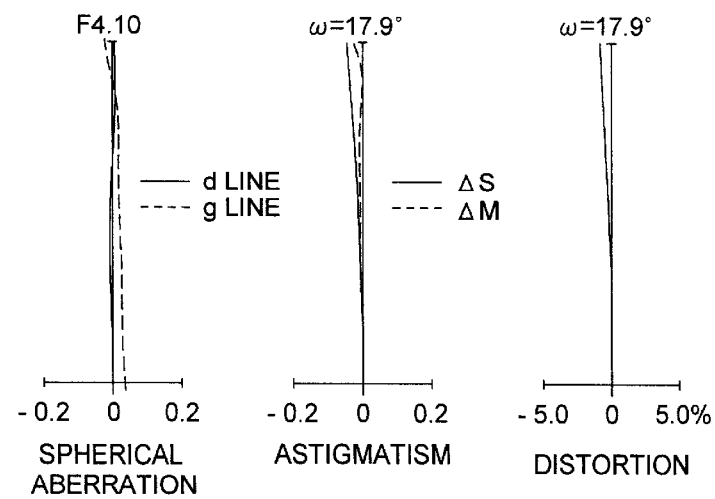

Example 1 is an example included in Structures 1–3,7–11 and 13–17. A sectional view of Example 1 is shown in FIG. 1, and lens aberration diagrams are shown in FIG. 2. Lens data are shown in Table 1 and Table2.

TABLE 1 f = 5.42 to 10.3, $F_{NO}$ = 2.9 to 4.1, 2$\omega$ = 64.8° to 35.8°

| Surface No. | r | d | $n_d$ | $v_d$ |
|---|---|---|---|---|
| 1 | 38.176 | 1.000 | 1.816 | 46.6 |
| 2 | 3.774 | 1.540 | | |
| 3 | 6.520 | 1.900 | 1.847 | 23.8 |
| 4 | 14.470 | A | | |
| 5 | 5.912 | 1.700 | 1.806 | 40.9 |
| 6 | −03.932 | 0.200 | | |
| 7 | 3.372 | 1.100 | 1.773 | 49.6 |
| 8 | −31.181 | 0.550 | 1.847 | 23.8 |
| 9 | 3.956 | 0.950 | | |
| 10 | −60.314 | 1.000 | 1.816 | 46.6 |
| 11 | −11.999 | B | | |
| 12 | 21.816 | 1.400 | 1.729 | 54.7 |
| 13 | −21.830 | C | | |
| 14 | ∞ | | | |
| 15 | ∞ | 2.700 | 1.516 | 64.1 |
| | f | A | B | C |
| Wide-angle end | 5.42 | 7.88 | 4.8479 | 1.1918 |
| Intermediate area | 7.7 | 65 | 7.654 | 1.4185 |
| Telephoto end | 10.3 | 1.9438 | 10.5478 | 2.1946 |

TABLE 2

| Surface No. | Constant of the cone of aspheric surface<br>Coefficient of aspheric surface |
|---|---|
| Second surface | $\kappa = -1.59930 \times 10^0$<br>$A_4 = 2.42370 \times 10^{-3}$<br>$A_6 = -2.88290 \times 10^{-5}$<br>$A_8 = 1.57510 \times 10^{-6}$<br>$A_{10} = -3.42810 \times 10^{-8}$ |
| Fifth surface | $\kappa = -4.472020 \times 10^{-1}$<br>$A_4 = -2.63990 \times 10^{-4}$<br>$A_6 = -1.96440 \times 10^{-5}$<br>$A_8 = -2.07050 \times 10^{-7}$<br>$A_{10} = 6.31620 \times 10^{-7}$<br>$A_{12} = -7.31770 \times 10^{-8}$ |

$f_1 = -9.786$, $f_2 = 9.093$
$f_3 = 15.170$, $f_{2i} = 18.187$
$f_W/f_1 = -0.554$, $f_W/f_2 = 0.596$
$f_W/f_3 = -0.357$, $f_W/f_{2i} = 0.298$

Example 2

Figure 3:
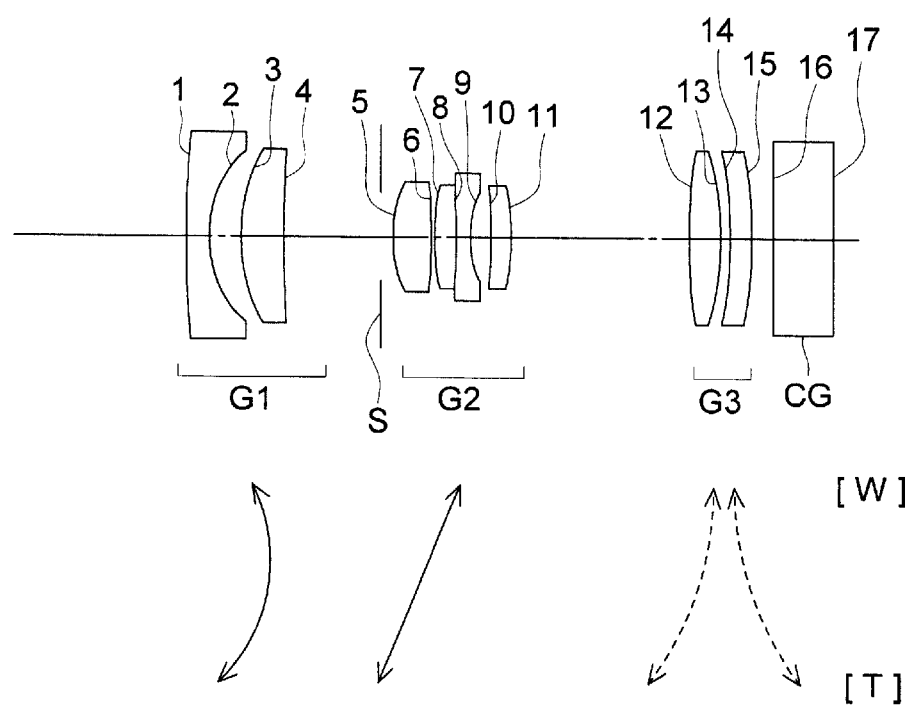
FIG. 3 is a sectional view of the lens in Example 2.
Figure 4:
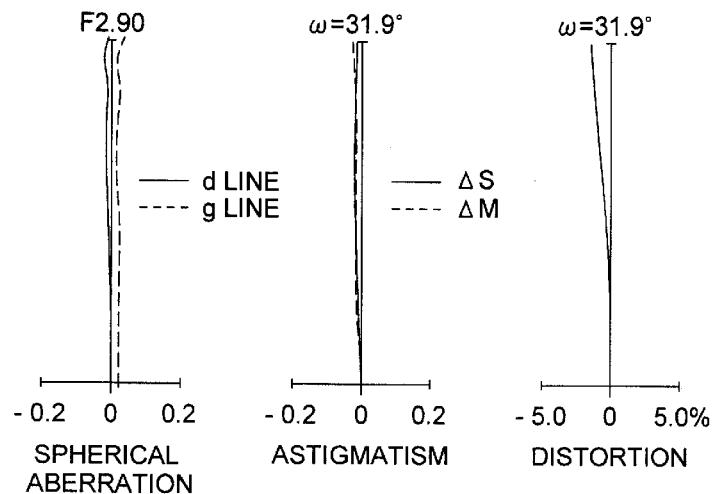
FIG. 4(a) shows lens aberrations at wide-angle end.
FIG. 4(b) shows intermediate area and FIG. 4(c) shows telephoto end in Example 2.
Figure 4:
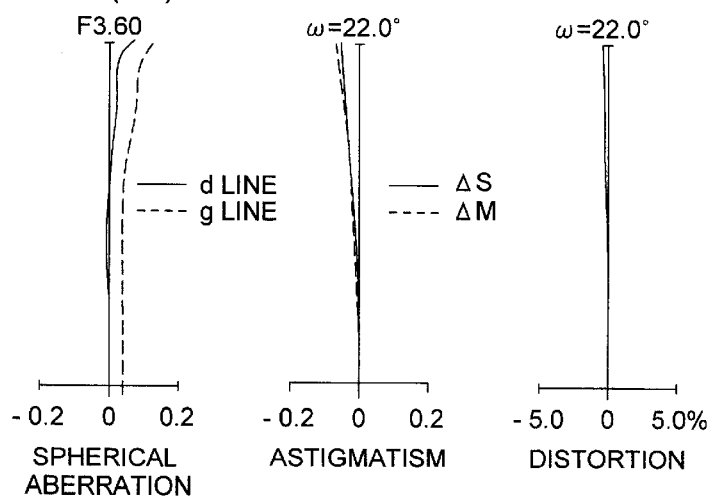
Figure 4:
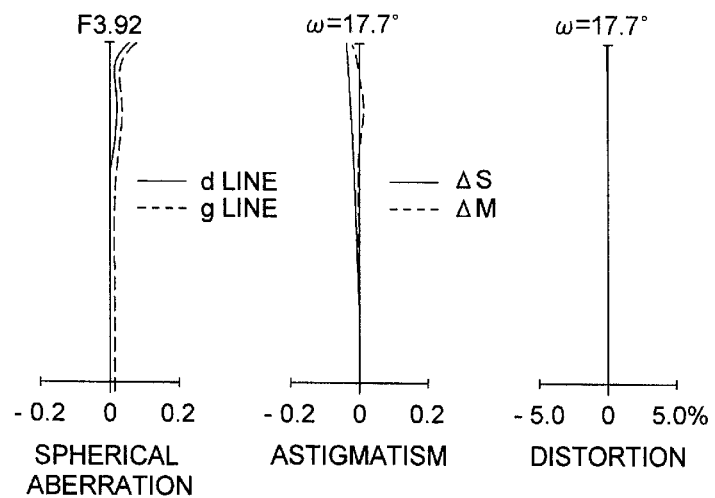

Example 2 is an example included in Structures 1–3, 7–11, 13, 16 and 17. A sectional view of Example 2 is shown in FIG. 3, and lens aberration diagrams are shown in FIG. 4. Lens data are shown in Table 3 and Table 4.

TABLE 3 f = 5.42 to 10.3, $F_{NO}$ = 2.9 to 3.92,
2ω = 63.8° to 35.4°

| Surface No. | r | d | $n_d$ | $v_d$ |
|---|---|---|---|---|
| 1 | 130.040 | 1.000 | 1.816 | 46.6 |
| 2 | 4.234 | 1.600 | | |
| 3 | 8.024 | 1.900 | 1.847 | 23.8 |
| 4 | 29.050 | A | | |
| 5 | 5.949 | 1.700 | 1.806 | 40.9 |
| 6 | 164.163 | 0.200 | | |
| 7 | 8.546 | 1.100 | 1.773 | 49.6 |
| 8 | −32.176 | 0.550 | 1.847 | 23.8 |
| 9 | 4.086 | 0.950 | | |
| 10 | −32.170 | 1.000 | 1.816 | 46.6 |
| 11 | −11.095 | B | | |
| 12 | 27.406 | 1.400 | 1.729 | 54.7 |
| 13 | −16.346 | 0.500 | | |
| 14 | −21.806 | 1.000 | 1.497 | 56.0*1 |
| 15 | −21.809 | C | | |
| 16 | ∞ | 2.700 | 1.516 | 64.1 |
| | ∞ | | | |
| | f | A | B | C |
| Wide-angle end | 5.42 | 9.0323 | 4.1301 | 1.1918 |
| Intermediate area | 8.17 | 4.7083 | 8.4333 | 1.0422 |
| Telephoto end | 10.3 | 1.9438 | 10.4009 | 2.1946 |

TABLE 4

| Surface No. | Constant of the cone of aspheric surface<br>Coefficient of aspheric surface |
|---|---|
| Second surface | $\kappa = -1.98870 \times 10^0$<br>$A_4 = 2.00030 \times 10^{-3}$<br>$A_6 = -4.18640 \times 10^{-5}$<br>$A_8 = 1.11100 \times 10^{-6}$<br>$A_{10} = -1.73250 \times 10^{-8}$ |
| Fifth surface | $\kappa = -3.69310 \times 10^{-1}$<br>$A_4 = -2.87000 \times 10^{-4}$<br>$A_6 = 3.59940 \times 10^{-5}$<br>$A_8 = -2.73620 \times 10^{-7}$<br>$A_{10} = 7.00240 \times 10^{-7}$<br>$A_{12} = -6.13400 \times 10^{-8}$ |
| Fifteenth surface | $\kappa = -9.61680 \times 10^0$<br>$A_4 = 8.05820 \times 10^{-5}$<br>$A_6 = -7.87460 \times 10^{-7}$<br>$A_8 = 1.19700 \times 10^{-7}$<br>$A_{10} = -6.90460 \times 10^{-9}$<br>$A_{12} = -7.31770 \times 10^{-8}$ |

$f_1 = -11.306, f_2 = 10.385$
$f_3 = 14.387, f_{2i} = 20.322$
$f_W/f_1 = -0.479, f_W/f_2 = 0.522$
$f_W/f_3 = 0.377, f_W/f_{2i} = 0.267$

Example 3

Figure 5:
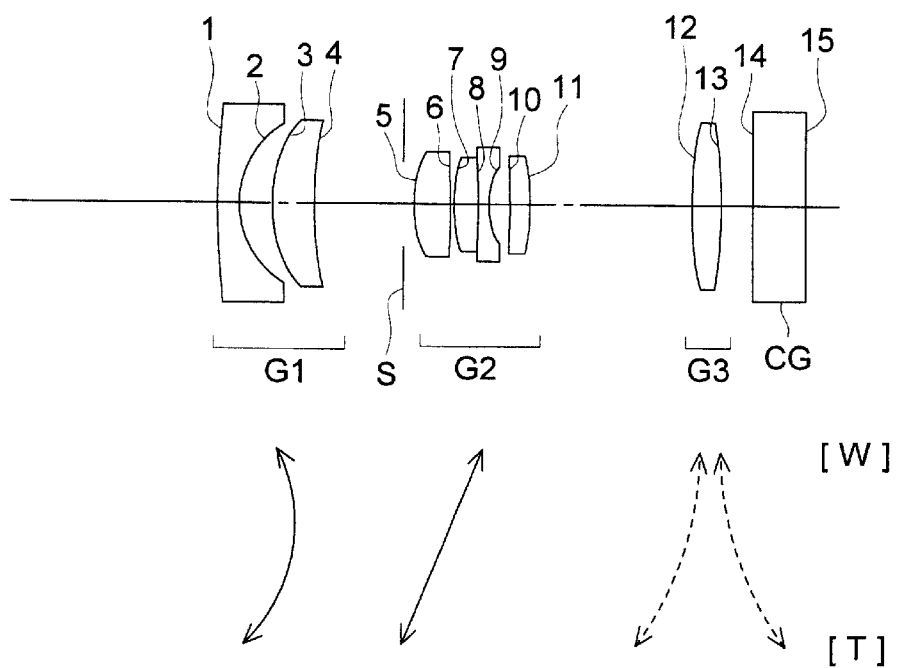
FIG. 5 is a sectional view of the lens in Example 3.
Figure 6:
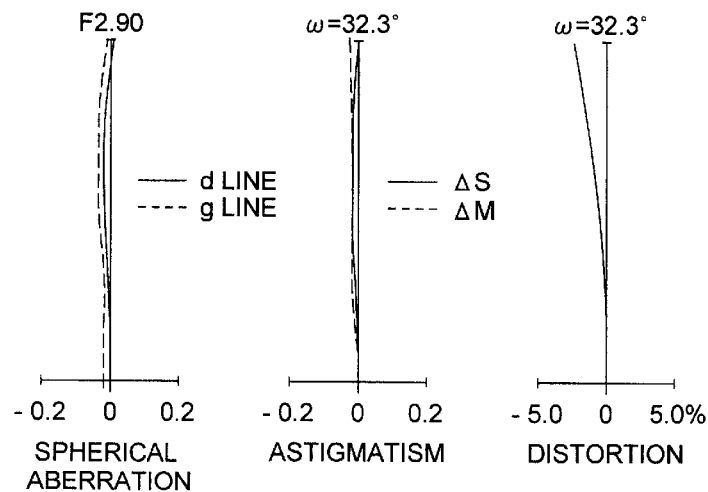
FIG. 6(a) shows lens aberrations at wide-angle end.
FIG. 6(b) shows intermediate area and FIG. 6(c) shows telephoto end in Example 3.
Figure 6:
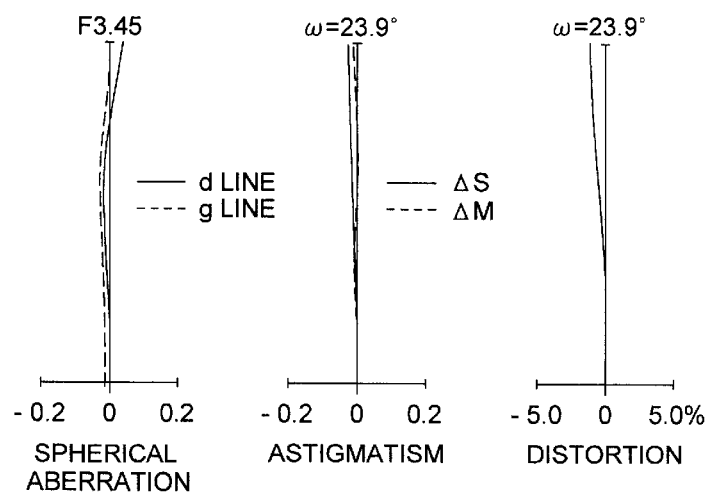
Figure 6:
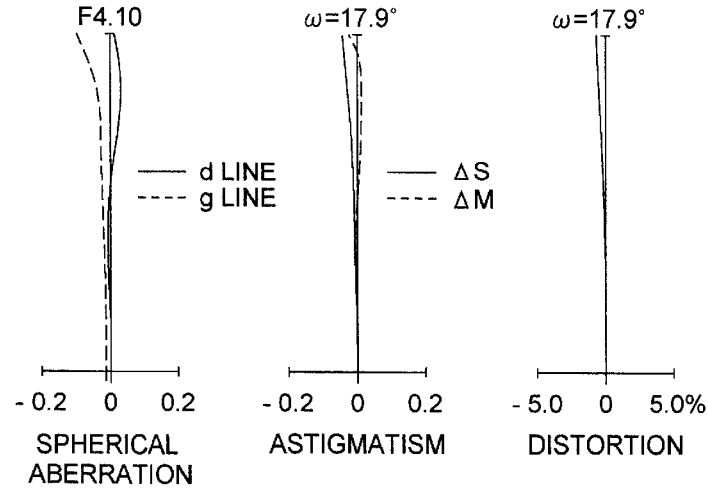

Example 3 is an example included in Structures 1–3, 7–11 and 13–17. A sectional view of Example 3 is shown in FIG. 5, and lens aberration diagrams are shown in FIG. 6. Lens data are shown in Table 5 and Table 6.

TABLE 5 f = 5.42 to 10.3, $F_{NO}$ = 2.9 to 4.1,
2ω = 64.6° to 35.8°

| Surface No. | r | d | $n_d$ | $v_d$ |
|---|---|---|---|---|
| 1 | 51.975 | 1.000 | 1.816 | 46.6 |
| 2 | 3.672 | 1.620 | | |

TABLE 5-continued f = 5.42 to 10.3, $F_{NO}$ = 2.9 to 4.1,
2ω = 64.6° to 35.8°

| Surface No. | r | d | $n_d$ | $v_d$ |
|---|---|---|---|---|
| 3 | 6.828 | 1.900 | 1.847 | 23.8 |
| 4 | 16.818 | A | | |
| 5 | 5.902 | 1.700 | 1.806 | 40.9 |
| 6 | −71.749 | 0.200 | | |
| 7 | 8.089 | 1.100 | 1.773 | 49.6 |
| 8 | −45.688 | 0.550 | 1.847 | 23.8 |
| 9 | 4.012 | 0.950 | | |
| 10 | −88.578 | 1.000 | 1.497 | 56.0*1 |
| 11 | −10.502 | B | | |
| 12 | 19.739 | 1.400 | 1.729 | 54.7 |
| 13 | −23.587 | C | | |
| 14 | ∞ | | | |
| 15 | ∞ | 2.700 | 1.51633 | 64.1 |
| | f | A | B | C |
| Wide-angle end | 5.42 | 7.3643 | 4.8374 | 1.1918 |
| Intermediate area | 7.58 | 4.2849 | 7.6904 | 1.3944 |
| Telephoto end | 10.3 | 1.9438 | 11.0319 | 2.1946 |

TABLE 6

| Surface No. | Constant of the cone of aspheric surface<br>Coefficient of aspheric surface |
|---|---|
| Second surface | $\kappa = -1.55830 \times 10^0$<br>$A_4 = 2.34490 \times 10^{-3}$<br>$A_6 = -3.52450 \times 10^{-5}$<br>$A_8 = 1.90430 \times 10^{-6}$<br>$A_{10} = -5.11630 \times 10^{-8}$ |
| Fifth surface | $\kappa = -5.94520 \times 10^{-1}$<br>$A_4 = -1.89300 \times 10^{-4}$<br>$A_6 = -9.991790 \times 10^{-6}$<br>$A_8 = -9.30860 \times 10^{-7}$<br>$A_{10} = 4.56480 \times 10^{-7}$<br>$A_{12} = -4.04630 \times 10^{-8}$ |
| Eleventh surface | $\kappa = -3.15160 \times 10^{-0}$<br>$A_4 = 9.95500 \times 10^{-5}$<br>$A_6 = 1.50500 \times 10^{-4}$<br>$A_8 = -4.93370 \times 10^{-5}$<br>$A_{10} = 7.26850 \times 10^{-6}$ |

$f_1 = -9.148, f_2 = 8.942$
$f_3 = 14.941, f_{2i} = 23.872$
$f_W/f_1 = -0.592, f_W/f_2 = 0.606$
$f_W/f_3 = 0.363, f_W/f_{2i} = 0.227$

Example 4

Figure 7:
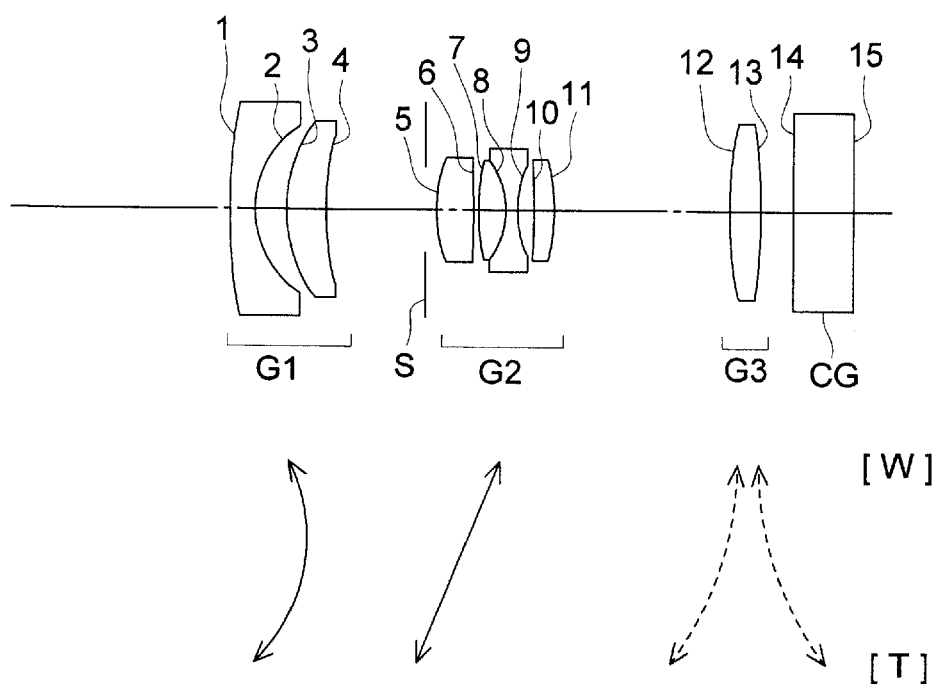
FIG. 7 is a sectional view of the lens in Example 4.
Figure 8:
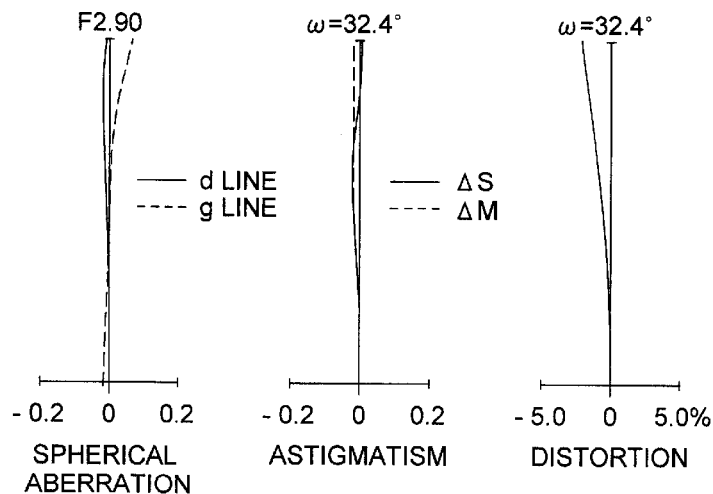
FIG. 8(a) shows lens aberrations at wide-angle end.
FIG. 8(b) shows intermediate area and FIG. 8(c) shows telephoto end in Example 4.
Figure 8:
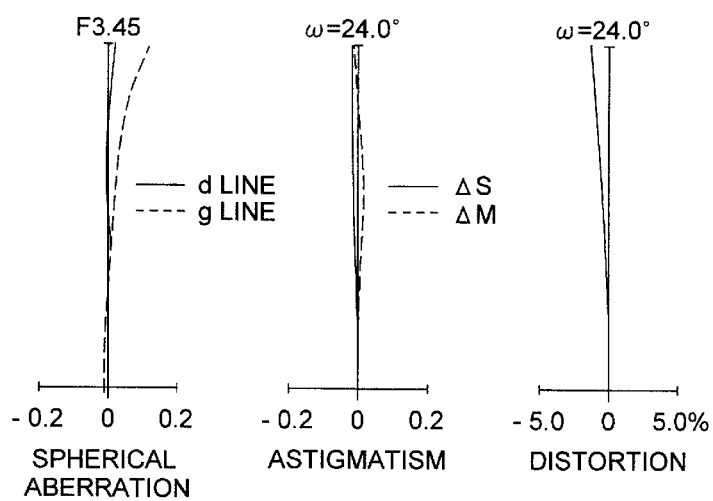
Figure 8:
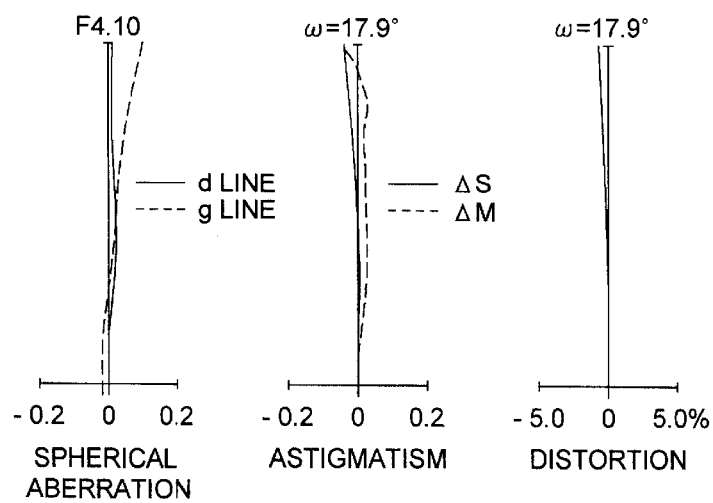

Example 4 is an example included in Structures 1–3, 7, 9–11 and 13–17. A sectional view of Example 4 is shown in FIG. 7, and lens aberration diagrams are shown in FIG. 8. Lens data are shown in Table 7 and Table 8.

TABLE 7 f = 5.42 to 10.3, $F_{NO}$ = 2.9 to 4.1,
2ω = 64.8° to 35.8°

| Surface No. | r | d | $n_d$ | $v_d$ |
|---|---|---|---|---|
| 1 | 35.417 | 1.000 | 1.816 | 46.6 |
| 2 | 3.854 | 1.520 | | |
| 3 | 6.588 | 1.900 | 1.847 | 23.8 |
| 4 | 14.723 | A | | |
| 5 | 6.869 | 1.720 | 1.806 | 40.9 |
| 6 | −31.284 | 0.200 | | |

TABLE 7-continued f = 5.42 to 10.3, $F_{NO}$ = 2.9 to 4.1,
2ω = 64.8° to 35.8°

| Surface No. | r | d | $n_d$ | $v_d$ |
|---|---|---|---|---|
| 7 | 8.83 | 1.280 | 1.497 | 56.0*1 |
| 8 | −3.798 | 0.500 | 1.583 | 30.0*2 |
| 9 | 3.494 | 0.800 | | |
| 10 | −60.314 | 1.000 | 1.816 | 46.6 |
| 11 | −9.862 | B | | |
| 12 | 15.953 | 1.400 | 1.729 | 54.7 |
| 13 | −29.669 | C | | |
| 14 | ∞ | | | |
| 15 | ∞ | 2.700 | 1.516 | 64.1 |
| | f | A | B | C |
| Wide-angle end | 5.42 | 8.3901 | 5.5373 | 1.1918 |
| Intermediate area | 7.56 | 4.5857 | 8.0845 | 1.5797 |
| Telephoto end | 10.3 | 1.9438 | 11.5657 | 2.1946 |

TABLE 8

| Surface No. | Constant of the cone of aspheric surface<br>Coefficient of aspheric surface |
|---|---|
| Second surface | $\kappa = -1.61830 \times 10^0$<br>$A_4 = 2.34370 \times 10^{-3}$<br>$A_6 = -2.52550 \times 10^{-5}$<br>$A_8 = 1.32910 \times 10^{-6}$<br>$A_{10} = -2.48880 \times 10^{-8}$ |
| Seventh surface | $\kappa = -1.19890 \times 10^{+1}$<br>$A_4 = -5.93920 \times 10^{-4}$<br>$A_6 = -2.37940 \times 10^{-6}$<br>$A_8 = -2.18520 \times 10^{-5}$<br>$A_{10} = 4.18620 \times 10^{-6}$<br>$A_{12} = -4.04630 \times 10^{-8}$ |
| Ninth surface | $\kappa = -8.05300 \times 10^{-1}$<br>$A_4 = -2.52330 \times 10^{-3}$<br>$A_6 = 1.84040 \times 10^{-4}$<br>$A_8 = -6.31910 \times 10^{-5}$<br>$A_{10} = 1.46880 \times 10^{-5}$ |

$f_1 = -10.287$, $f_2 = 9.646$
$f_3 = 14.415$, $f_{2i} = 14.320$
$f_W/f_1 = -0.527$, $f_W/f_2 = 0.562$
$f_W/f_3 = 0.376$, $f_W/f_{2i} = 0.378$

Example 5

Figure 9:
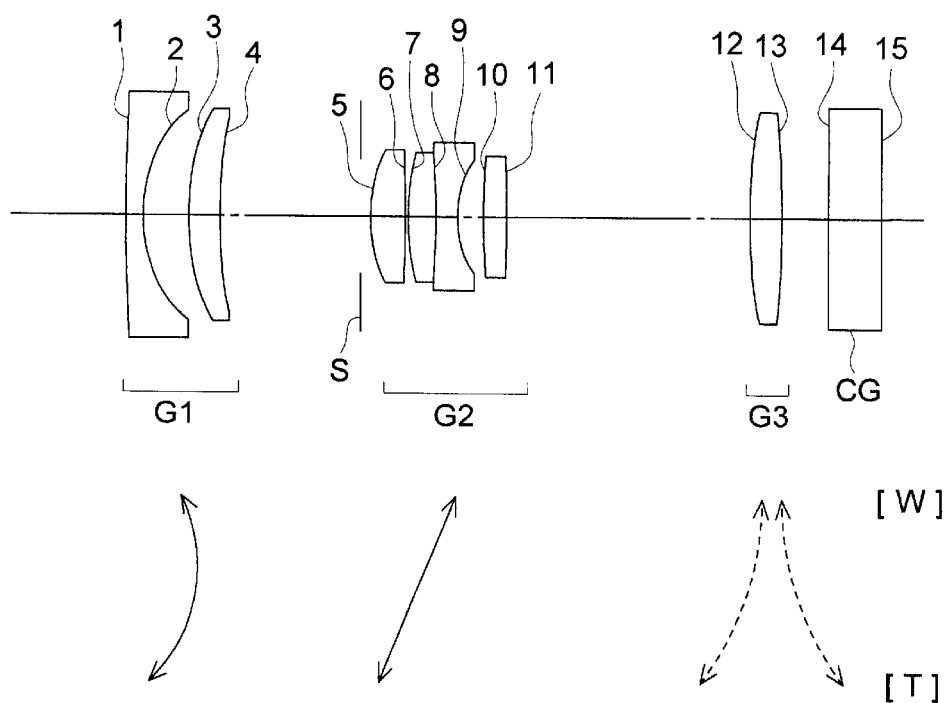
FIG. 9 is a sectional view of the lens in Example 5.
Figure 10:
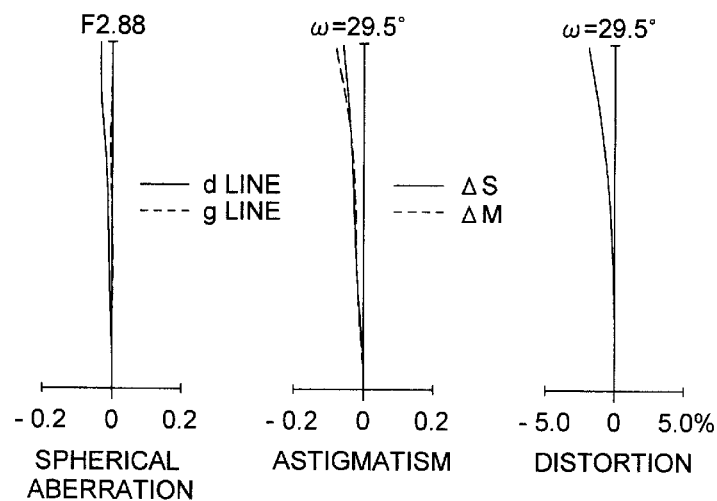
FIG. 10(a) shows lens aberrations at wide-angle end.
FIG. 10(b) shows intermediate area and FIG. 10(c) shows telephoto end in Example 5.
Figure 10:
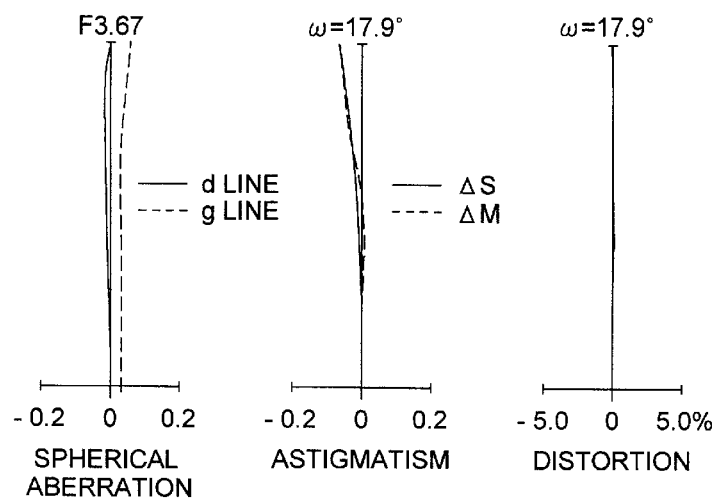
Figure 10:
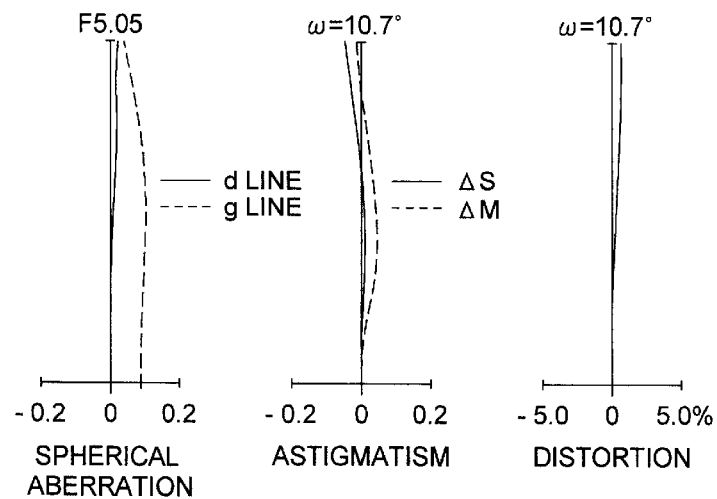

Example 5 is an example included in Structures 1–3, 7–9, 11, 13–15 and 17. A sectional view of Example 5 is shown in FIG. 9, and lens aberration diagrams are shown in FIG. 10. Lens data are shown in Table 9 and Table 10.

TABLE 9 f = 8.25 to 23.35, $F_{NO}$ = 2.88 to 5.05,
2ω = 59° to 21.4°

| Surface No. | r | d | $n_d$ | $v_d$ |
|---|---|---|---|---|
| 1 | 124.787 | 1.000 | 1.816 | 46.6 |
| 2 | 7.462 | 2.410 | | |
| 3 | 12.249 | 1.760 | 1.847 | 23.8 |
| 4 | 27.84 | A | | |
| 5 | 8.059 | 1.800 | 1.806 | 40.9 |
| 6 | 1609.948 | 0.200 | | |
| 7 | 15.173 | 1.490 | 1.773 | 49.6 |
| 8 | −42.814 | 1.290 | 1.805 | 25.4 |
| 9 | 5.607 | 1.380 | | |
| 10 | 44.681 | 1.170 | 1.729 | 46.6 |
| 11 | −44.701 | B | | |
| 12 | 32.271 | 1.800 | 1.697 | 55.5 |
| 13 | −38.5 | C | | |

TABLE 9-continued f = 8.25 to 23.35, $F_{NO}$ = 2.88 to 5.05,
2ω = 59° to 21.4°

| Surface No. | r | d | $n_d$ | $v_d$ |
|---|---|---|---|---|
| 14 | ∞ | 2.970 | 1.516 | 64.1 |
| 15 | ∞ | | | |
| | f | A | B | C |
| Wide-angle end | 8.25 | 17.441 | 7.377 | 2.23 |
| Intermediate area | 13.88 | 7.55 | 13.255 | 2.504 |
| Telephoto end | 23.35 | 1.9 | 23.8 | 2.475 |

TABLE 10

| Surface No. | Constant of the cone of aspheric surface<br>Coefficient of aspheric surface |
|---|---|
| Second surface | $\kappa = -3.01053 \times 10^0$<br>$A_4 = 7.09210 \times 10^{-4}$<br>$A_6 = -8.29270 \times 10^{-6}$<br>$A_8 = 1.15660 \times 10^{-7}$<br>$A_{10} = -7.93770 \times 10^{-10}$ |
| Fifth surface | $\kappa = -1.79802 \times 10^0$<br>$A_4 = 2.50050 \times 10^{-4}$<br>$A_6 = -1.05780 \times 10^{-6}$<br>$A_8 = 1.99960 \times 10^{-8}$<br>$A_{10} = -9.49600 \times 10^{-10}$<br>$A_{12} = -4.04630 \times 10^{-8}$ |
| Thirteenth surface | $\kappa = 0.00000 \times 10^0$<br>$A_4 = 1.15720 \times 10^{-4}$<br>$A_6 = -5.34510 \times 10^{-6}$<br>$A_8 = 1.72140 \times 10^{-7}$<br>$A_{10} = -2.20400 \times 10^{-9}$ |

$f_1 = -18.260$, $f_2 = 14.686$
$f_3 = 25.460$, $f_{2i} = 30.816$
$f_W/f_1 = -0.452$, $f_W/f_2 = 0.562$
$f_W/f_3 = 0.324$, $f_W/f_{2i} = 0.268$

Example 6

Figure 11:
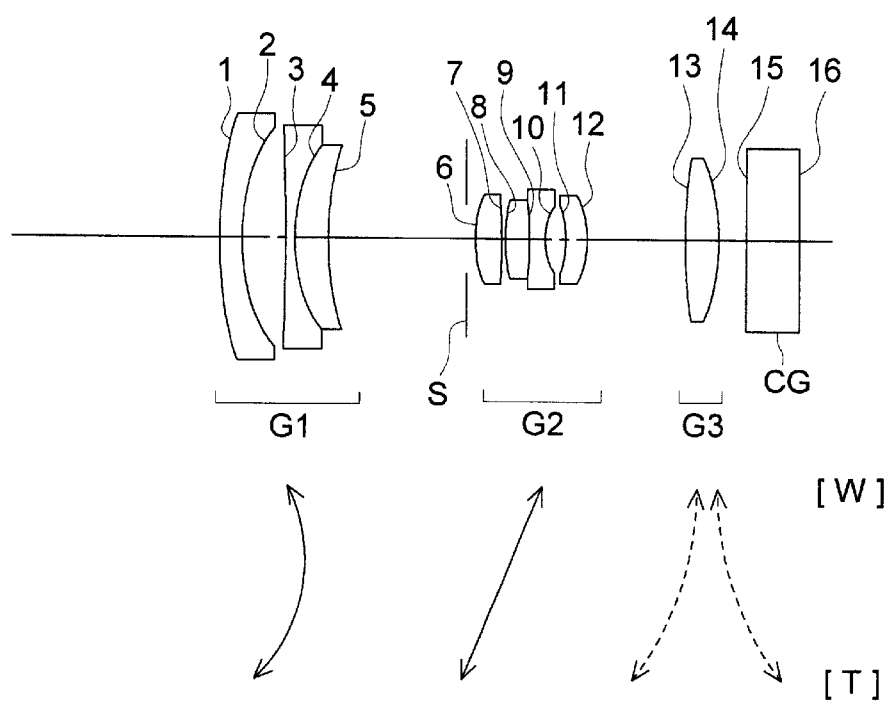
FIG. 11 is a sectional view of the lens in Example 6.
Figure 12:
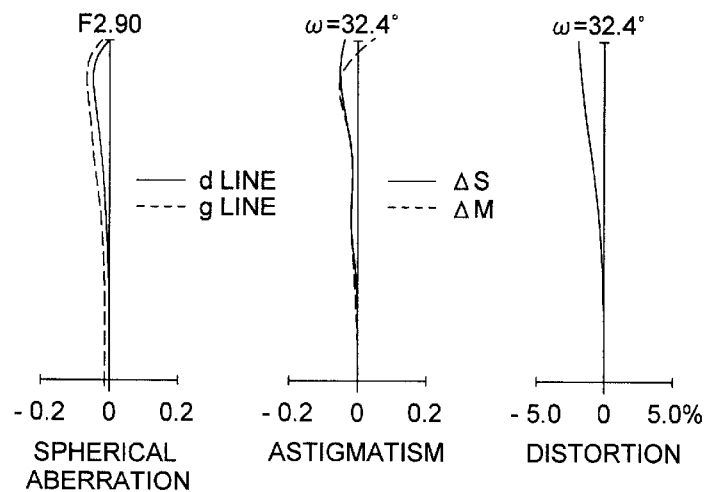
FIG. 12(a) shows lens aberrations at wide-angle end.
FIG. 12(b) shows intermediate area and FIG. 12(c) shows telephoto end in Example 6.
Figure 12:
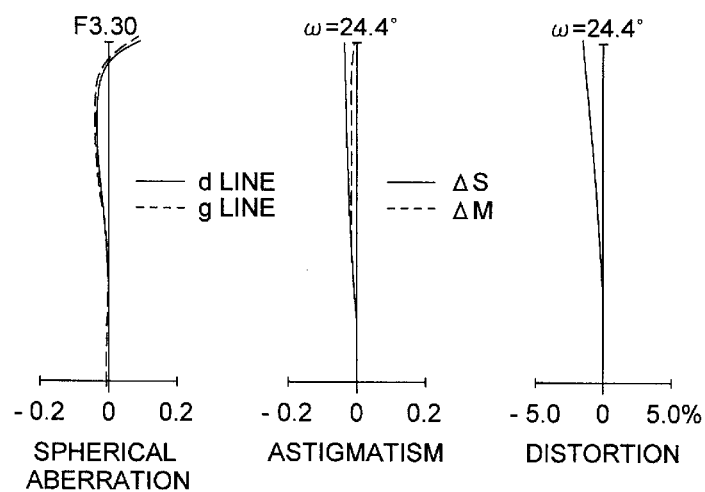
Figure 12:
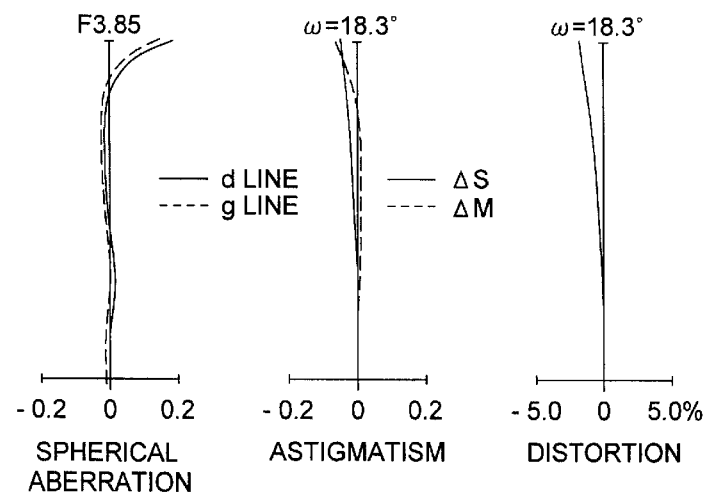

Example 6 is an example included in Structures 1, 4–11 and 13–17. A sectional view of Example 6 is shown in FIG. 11, and lens aberration diagrams are shown in FIG. 12. Lens data are shown in Table 11 and Table 12.

TABLE 11 f = 5.42 to 10.3, $F_{NO}$ = 2.9 to 3.85,
2ω = 64.8° to 36.6°

| Surface No. | r | d | $n_d$ | $v_d$ |
|---|---|---|---|---|
| 1 | 20.278 | 1.000 | 1.883 | 40.8 |
| 2 | 9.336 | 1.960 | | |
| 3 | −396.301 | 0.600 | 1.516 | 64.1 |
| 4 | 7.975 | 1.600 | 1.847 | 23.8 |
| 5 | 15.834 | A | | |
| 6 | 5.137 | 1.220 | 1.806 | 40.9 |
| 7 | −22.737 | 0.200 | | |
| 8 | 10.276 | 1.100 | 1.773 | 49.6 |
| 9 | −32.327 | 0.800 | 1.847 | 23.8 |
| 10 | 3.166 | 0.950 | | |
| 11 | −4.736 | 1.000 | 1.816 | 46.6 |
| 12 | −4.48 | B | | |
| 13 | 33.559 | 0.500 | 1.729 | 54.7 |
| 14 | −9.983 | C | | |
| 15 | ∞ | 2.700 | 1.516 | 64.1 |
| 16 | ∞ | | | |
| | f | A | B | C |
| Wide-angle end | 5.42 | 11.583 | 2.798 | 1.1918 |
| Intermediate area | 7.47 | 6.5829 | 4.8643 | 1.3266 |
| Telephoto end | 10.3 | 1.9438 | 6.9381 | 2.1946 |

TABLE 12

| Surface No. | Constant of the cone of aspheric surface<br>Coefficient of aspheric surface |
|---|---|
| Sixth surface | $\kappa = -2.81200 \times 10^0$<br>$A_4 = 7.39610 \times 10^{-4}$<br>$A_6 = 6.30910 \times 10^{-4}$<br>$A_8 = -4.17880 \times 10^{-4}$<br>$A_{10} = 6.95530 \times 10^{-5}$ |
| Seventh surface | $\kappa = -2.81200 \times 10^0$<br>$A_4 = 7.39610 = 10^{-4}$<br>$A_6 = 6.30910 \times 10^{-4}$<br>$A_8 = -4.17880 \times 10^{-4}$<br>$A_{10} = 6.95530 \times 10^{-5}$ |
| | $f_1 = -15.714, f_2 = 10.235$<br>$f_3 = 10.708, f_{2i} = 36.863$<br>$f_w/f_1 = -0.345, f_w/f_2 = 0.530$<br>$f_w/f_3 = 0.506, f_w/f_{2i} = 0.147$ |

Example 7

Figure 13:
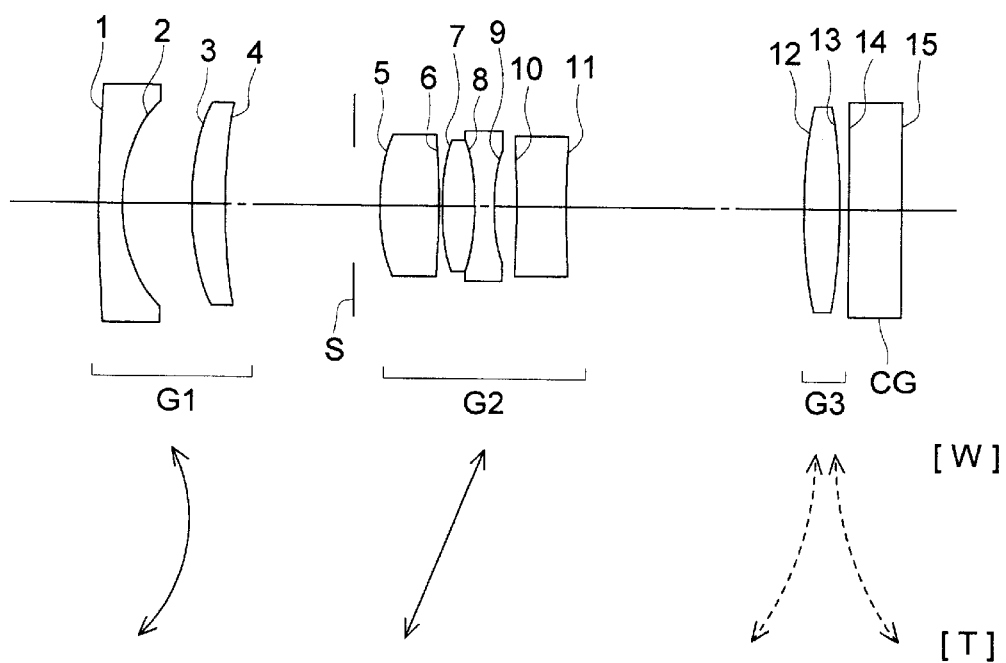
FIG. 13 is a sectional view of the lens in Example 7.
Figure 14:
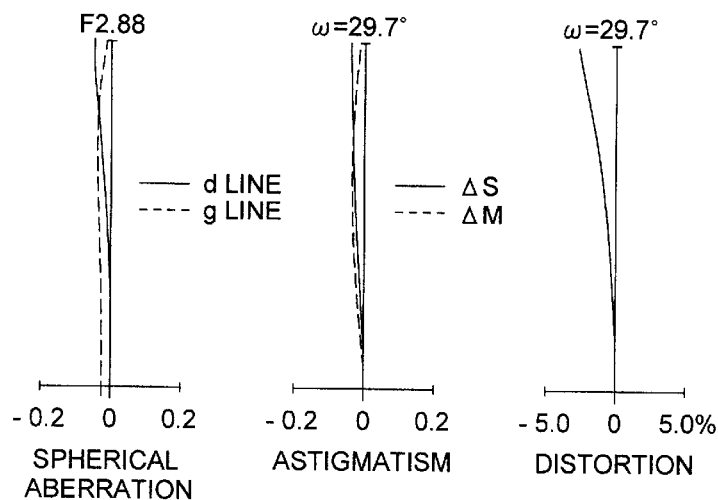
FIG. 14(a) shows lens aberrations at wide-angle end.
FIG. 14(b) shows intermediate area and FIG. 14(c) shows telephoto end in Example 7.
Figure 14:
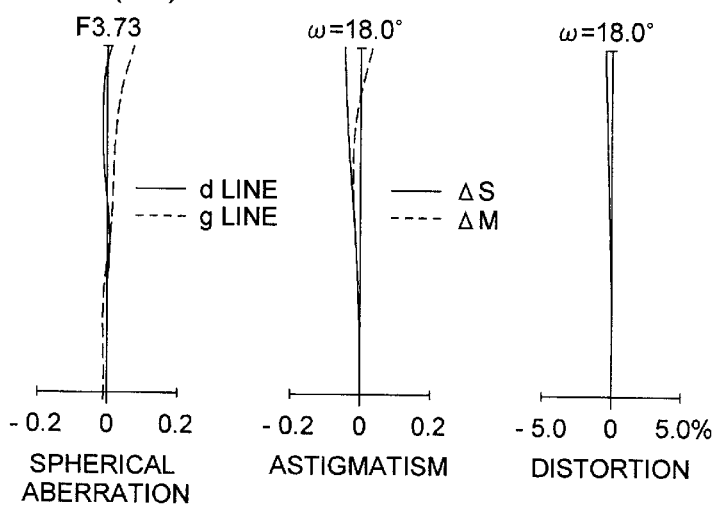
Figure 14:
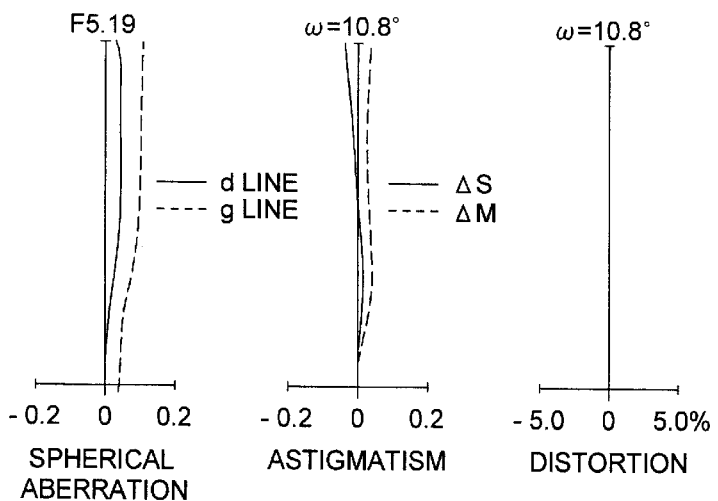

Example 7 is an example included in Structures 1–3, 7–9 and 12–17. A sectional view of Example 7 is shown in FIG. 13, and lens aberration diagrams are shown in FIG. 14. Lens data are shown in Table 13 and Table 14.

TABLE 13

$f = 8.25$ to $23.4$, $F_{NO} = 2.88$ to $5.19$,
$2\omega = 29.7°$ to $10.8°$

| Surface No. | r | d | $n_d$ | $v_d$ |
|---|---|---|---|---|
| 1 | 352.892 | 1.1 | 1.7725 | 49.6 |
| 2 | 7.759 | 4.07 | | |
| 3 | 15.041 | 2 | 1.84666 | 23.8 |
| 4 | 31.135 | A | | |
| 5 | 10.501 | 3.54 | 1.8061 | 40.9 |
| 6 | −153.442 | 0.2 | | |
| 7 | 13.935 | 1.79 | 1.7432 | 49.3 |
| 8 | −16.479 | 1.12 | 1.80518 | 25.4 |
| 9 | 9.574 | 1.32 | | |
| 10 | −87.968 | 3.03 | 1.69895 | 30.1 |
| 11 | 214.039 | B | | |
| 12 | 27.534 | 2 | 1.72916 | 54.7 |
| 13 | −46.977 | C | | |
| 14 | ∞ | 2.97 | 1.51633 | 64.1 |
| 15 | ∞ | | | |
| | f | A | B | C |
| Wide-angle end | 8.25 | 17.34 | 7.22 | 0.50 |
| Intermediate area | 13.90 | 7.51 | 13.99 | 0.57 |
| Telephoto end | 23.40 | 1.71 | 25.50 | 0.64 |

TABLE 14

| Surface No. | Constant of the cone of aspheric surface<br>Coefficient of aspheric surface |
|---|---|
| Second surface | $\kappa = -7.3983 \times 10^{-1}$<br>$A_4 = 9.43650 \times 10^{-6}$<br>$A_6 = 9.90240 \times 10^{-7}$<br>$A_8 = -2.76690 \times 10^{-8}$<br>$A_{10} = 2.81530 \times 10^{-10}$ |
| Fifth surface | $\kappa = -2.07546 \times 10^{-1}$<br>$A_4 = -2.28120 \times 10^{-5}$<br>$A_6 = 2.50320 \times 10{-7}$<br>$A_8 = -2.20680 \times 10^{-8}$<br>$A_{10} = 5.46850 \times 10^{-10}$ |
| Eleventh surface | $\kappa = -8.63780 \times 10^{+2}$<br>$A_4 = 4.74740 \times 10^{-4}$<br>$A_6 = 1.29050 \times 10^{-6}$<br>$A_8 = 9.51120 \times 10^{-7}$<br>$A_{10} = -3.74230 \times 10^{-8}$ |

TABLE 14-continued $f_1 = -17.480, f_2 = 15.482$
$f_3 = 24.080, f_{2i} = -88.831$
$f_w/f_1 = -0.472, f_w/f_2 = 0.533$
$f_w/f_3 = 0.343, f_w/f_{2i} = -0.093$ The structures stated above produce the following effect to provide a zoom lens which has high image forming power with a ratio of about 2–3 for variable magnification and is suitable to be used for a digital still camera employing CCD.

What is claimed is:

1. A zoom lens system having an object side to face an object and an image side to face an image forming plane, comprising:

a zoom lens consisting of three lens groups:
  a first lens group having a negative refracting power;
  a second lens group having a positive refracting power; and
  a third lens group having a positive refracting power arranged serially in this order from the object side,
wherein the second lens group comprises a positive lens, a cemented lens including a positive lens and a negative lens and one lens arranged serially in this order from the object side, and when changing a magnification from a wide-angle side to a telephoto side, the first, second and third lens groups are moved on an optical axis so that a distance between the first lens group and the second lens group is reduced and a distance between the second lens group and the third lens group is increased for the magnification change, and wherein the following conditional expression is satisfied:

$$0.4 < f_w/f_2 < 1.0$$

where $f_2$ represents a focal length of the second lens group and $f_w$ represents a focal length of the total optical system at a wide-angle end.

2. The zoom lens system of claim 1, wherein the first lens group has at least a single aspherical surface and comprises two lenses of a negative lens and a positive lens arranged serially from the object side, and wherein the zoom lens satisfies the following conditional formula:

$$-0.7 < f_w/f_1 < 0.3$$

where $f_1$ is a focal length of the first lens group.

3. The zoom lens system of claim 2, wherein the first lens group comprises two lenses: a negative meniscus lens and a positive meniscus arranged serially from the object side, wherein the negative meniscus lens has a concave surface positioned to face the image side and the positive meniscus has a convex surface positioned to face the object side.

4. The zoom lens system of claim 1, wherein the first lens group comprises three lenses: two negative lenses and a single positive lens, and wherein the zoom lens satisfies the following conditional formula:

$$-0.7 < f_w/f_1 < -0.3$$

where $f_1$ is a focal length of the first lens group.

5. The zoom lens system of claim 4, wherein the first lens group comprises three lenses: a negative meniscus lens, a negative lens and a positive lens arranged serially from the object side, and the negative meniscus has a concave surface positioned to face the image side.

6. The zoom lens system of claim 4, wherein the first lens group comprises a negative meniscus lens and a composite lens arranged serially from the object side, the negative meniscus lens has a concave surface positioned to face the image side, the composite lens comprises a negative lens and a positive meniscus lens which are cemented to each other, and the positive meniscus lens has a convex surface positioned to face the object side.

7. The zoom lens system of claim 1, wherein the second lens group comprises at least one aspherical surface.

8. The zoom lens system of claim 7, wherein a positive lens which is positioned closest to the object side in the second lens group has at least one aspherical surface.

9. The zoom lens system of claim 7, wherein the zoom lens satisfies the following conditional formula:

$$|f_w/f_{2i}|<0.5$$

where $f_{2i}$ is a focal length of a lens positioned closest to the image side in the second group.

10. The zoom lens system of claim 9, wherein a lens positioned closest to the image side in the second lens group is a meniscus lens having a convex surface positioned to face the image side, and wherein the zoom lens satisfies the following conditional formula:

$$|f_w/f_{2i}|<0.4.$$

11. The zoom lens system of claim 9, wherein a lens positioned closest to the image side in the second lens group is a positive lens, and wherein the zoom lens satisfies the following conditional formula:

$$0.0<f_w/f_{2i}<0.4.$$

12. The zoom lens system of claim 9, wherein a lens positioned closest to the image side in the second lens group is a negative lens, and wherein the zoom lens satisfies the following conditional formula:

$$-0.3<f_w/f_{2i}<0.0.$$

13. The zoom lens system of claim 7, wherein the zoom lens satisfies the following conditional formula:

$$0.5<f_w/f_2<0.7$$

where $f_2$ is a focal length of the second lens group.

14. The zoom lens system of claim 1, wherein the third lens group comprises a single lens having a positive refracting power.

15. The zoom lens system of claim 14, wherein the third lens group comprises a single lens having a positive refracting power larger than Abbe's number of 50.

16. The zoom lens system of claim 1, wherein when the zoom lens zooms an image from the wide angle end to the telephoto end, the third lens group moves on the optical axis, and wherein the zoom lens satisfies the following conditional formula:

$$0.2<f_w/f_3<0.7$$

where $f_3$ is a focal length of the third lens group.

17. The zoom lens system of claim 1, wherein the third lens group conducts focusing from an object at an infinite point to an object at a short distance by shifting in an optical axis direction, and wherein the zoom lens satisfies the following conditional formula:

$$0.2<f_w/f_3<0.7$$

where $f_3$ is a focal length of the third lens group.

18. A zoom lens having an object side to face an object and an image side to face an image forming plane, comprising:

three lens groups including a first lens group having a negative refracting power, a second lens group having a positive refracting power and a third lens group having a positive refracting power arranged serially in this order from the object side, wherein the second lens group comprises a positive lens, a cemented lens including a positive lens and a negative lens and one lens arranged serially in this order from the object side, and when changing a magnification from a wide-angle side to a telephoto side, the first, second and third lens groups are moved on an optical axis so that a distance between the first lens group and the second lens group is reduced and a distance between the second lens group and the third lens group is increased for the magnification change, wherein the following conditional expression is satisfied:

$$0.4<f_w/f_2<1.0$$

where $f_2$ represents a focal length of the second lens group and $f_w$ represents a focal length of the total optical system at a wide-angle end, wherein the first lens group comprises three lenses of two negative lenses and a single positive lens, wherein the zoom lens satisfies the following conditional formula:

$$-0.7<f_w/f_1<-0.3$$

where $f_1$ is a focal length of the first lens group, wherein the first lens group comprises three lenses of a negative meniscus lens, a negative lens and a positive lens arranged serially from the object side, and the negative meniscus has a concave surface positioned to face the image side, and wherein the first lens group comprises a negative meniscus lens and a composite lens arranged serially from the object side, the negative meniscus lens has a concave surface positioned to face the image side, the composite lens comprises a negative lens and a positive meniscus lens which are cemented to each other, and the positive meniscus lens has a convex surface positioned to face the object side.

19. A zoom lens having an object side to face an object and an image side to face an image forming plane, comprising:

three lens groups including a first lens group having a negative refracting power, a second lens group having a positive refracting power and a third lens group having a positive refracting power arranged serially in this order from the object side, wherein the second lens group comprises a positive lens, a cemented lens including a positive lens and a negative lens and one lens arranged serially in this order from the object side, and when changing a magnification from a wide-angle side to a telephoto side, the first, second and third lens groups are moved on an optical axis so that a distance between the first lens group and the second lens group is reduced and a distance between the second lens group and the third lens group is increased for the magnification change, wherein the following conditional expression is satisfied:

$0.4 < f_w/f_2 < 1.0$ where $f_2$ represents a focal length of the second lens group and $f_w$ represents a focal length of the total optical system at a wide-angle end, wherein the second lens group comprises at least one aspherical surface, and wherein a positive lens which is positioned closest to the object side in the second lens group has at least one aspherical surface.

20. A zoom lens having an object side to face an object and an image side to face an image forming plane, comprising:

three lens groups including a first lens group having a negative refracting power, a second lens group having a positive refracting power and a third lens group having a positive refracting power arranged serially in this order from the object side, wherein the second lens group comprises a positive lens, a cemented lens including a positive lens and a negative lens and one lens arranged serially in this order from the object side, and when changing a magnification from a wide-angle side to a telephoto side, the first, second and third lens groups are moved on an optical axis so that a distance between the first lens group and the second lens group is reduced and a distance between the second lens group and the third lens group is increased for the magnification change, wherein the following conditional expression is satisfied:

$0.4 < f_w/f_2 < 1.0$ where $f_2$ represents a focal length of the second lens group and $f_w$ represents a focal length of the total optical system at a wide-angle end, wherein the second lens group comprises at least one aspherical surface, and wherein the zoom lens satisfies the following conditional formula:

$|f_w/f_{2i}| < 0.5$ where $f_{2i}$ is a focal length of a lens positioned closest to the image side in the second group.

21. The zoom lens of claim 20, wherein a lens positioned closest to the image side in the second lens group is a meniscus lens having a convex surface positioned to face the image side, and wherein the zoom lens satisfies the following conditional formula:

$|f_w/f_{2i}| < 0.4$.

22. The zoom lens of claim 20, wherein a lens positioned closest to the image side in the second lens group is a positive lens, and wherein the zoom lens satisfies the following conditional formula:

$0.0 < f_w/f_{2i} < 0.4$.

23. The zoom lens of claim 20, wherein a lens positioned closest to the image side in the second lens group is a negative lens, and wherein the zoom lens satisfies the following conditional formula:

$-0.3 < f_w/f_{2i} < 0.0$.

24. A zoom lens having an object side to face an object and an image side to face an image forming plane, comprising:

three lens groups including a first lens group having a negative refracting power, a second lens group having a positive refracting power and a third lens group having a positive refracting power arranged serially in this order from the object side, wherein the second lens group comprises a positive lens, a cemented lens including a positive lens and a negative lens and one lens arranged serially in this order from the object side, and when changing a magnification from a wide-angle side to a telephoto side, the first, second and third lens groups are moved on an optical axis so that a distance between the first lens group and the second lens group is reduced and a distance between the second lens group and the third lens group is increased for the magnification change, wherein the following conditional expression is satisfied:

$0.4 < f_w/f_2 < 1.0$ where $f_2$ represents a focal length of the second lens group and $f_w$ represents a focal length of the total optical system at a wide-angle end, and wherein the third lens group comprises a single lens having a positive refracting power.

25. The zoom lens of claim 24, wherein the third lens group comprises a single lens having a positive refracting power larger than Abbe's number of 50.

* * * * *